Figure 1:
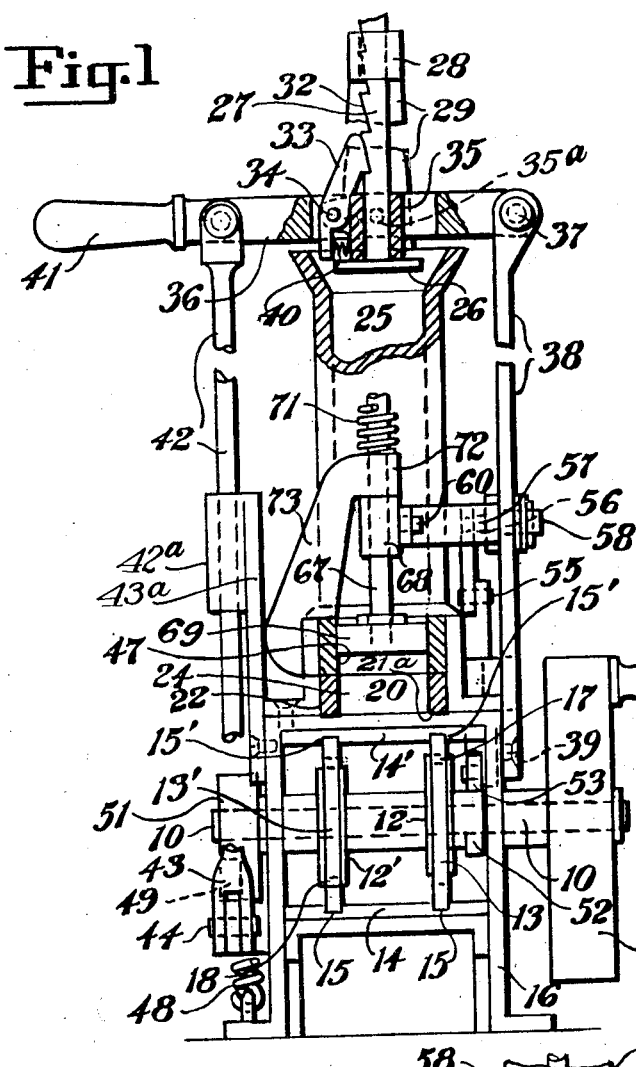

Nov. 29, 1927.  
W. REILLY  
1,651,040  
MACHINE FOR FORMING HAMBURGER STEAKS  
Filed June 24, 1926  
3 Sheets-Sheet 1

INVENTOR  
William Reilly

William Reilly INVENTOR

Nov. 29, 1927.  W. REILLY  1,651,040
MACHINE FOR FORMING HAMBURGER STEAKS
Filed June 24, 1926   3 Sheets-Sheet 3
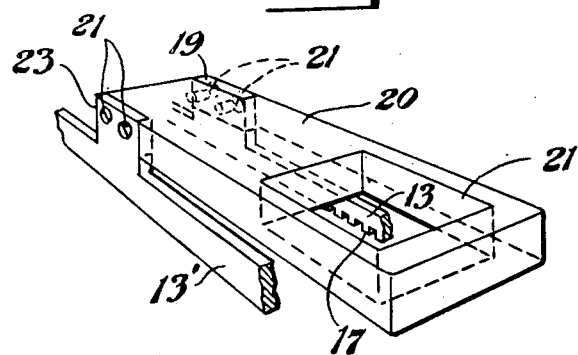
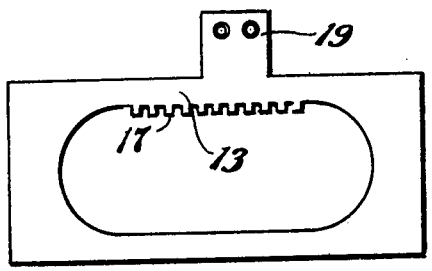
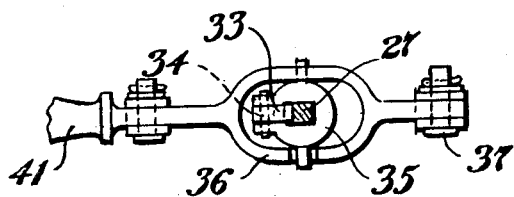
INVENTOR:
William Reilly Patented Nov. 29, 1927.

1,651,040

UNITED STATES PATENT OFFICE.

WILLIAM REILLY, OF WHITE PLAINS, NEW YORK.

MACHINE FOR FORMING HAMBURGER STEAKS.

Application filed June 24, 1926. Serial No. 118,351.

This invention relates to improvements in automatic meat severing machines and more particularly to a machine for caking and shearing hamburger steak.

One of the objects of my invention is to provide a simple, efficient and inexpensive machine for forming hamburger cakes automatically by means of a machine capable of expediting the operation of hamburger cake formation.

Another object of my invention is to provide manually controlled means for effecting the formation of hamburger steak slices rapidly and accurately, in uniform sizes and thicknesses.

A still further object of my invention is to provide highly improved mechanism designed, upon each revolution of a fly-wheel to cut a slice of hamburger steak and to deliver it from the machine.

Another object of my invention is to provide, in a machine of the character described means for automatically feeding hamburger steak in a chute which is designed to pre-determinately deliver slices of hamburger steak of a uniform thickness and weight.

Another object of my invention is to provide in a machine as described means for automatically tamping hamburger steak from the chute into a slice former, whereby it is assured that at regular intervals the meat in the chute will be pressed downwardly into the former ready for a severing action.

A still further object of my invention is to provide shearing means associated with the steak forming means designed to sever the contents of the former from the contents of the chute.

And another object of my invention is to provide means in said machine for automatically effecting the expressing of the meat from the former so same may drop upon any desired table or under support.

A still further object of my invention is to provide in a machine of the character described means for synchronizing the respective operations of the meat tamping means in the chute, the meat severing means, and the meat expressing means so that these means may all act in time intermittently.

In carrying out the foregoing means and objects I provide a unitary drive shaft on the machine and connect on this unitary shaft mechanism for timing the operation as well as for actuating the movement, of the various means for effecting the formation of hamburger slices or "cakes". It is designed that each time the machine turns over, or the fly-wheel turns around one hamburger steak will be formed and ejected from the machine ready for frying.

Lastly it is another object of my invention to permit the formation of hamburger steaks without actual contamination after the meat has been introduced directly into the chute, all movements of the parts of my machine occurring automatically.

With the above and other objects in view my invention consists in the combination, arrangement and details of construction disclosed in the drawings and specifications, and then more particularly pointed out in the appended claim.

Figure 2:
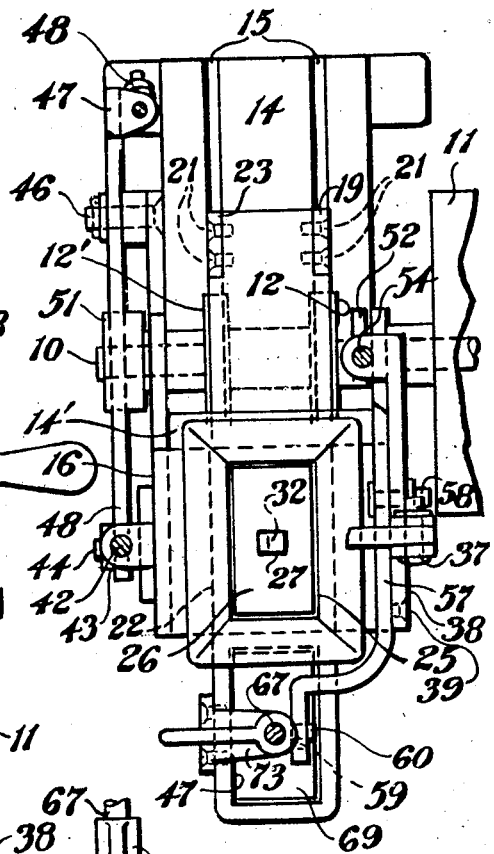
Figure 3:
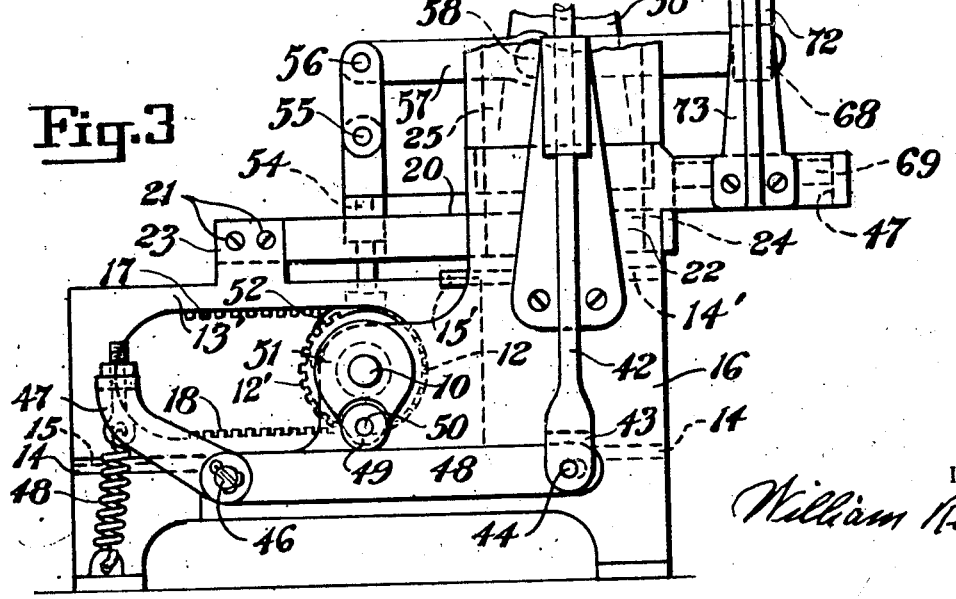
Figures 4, 5:
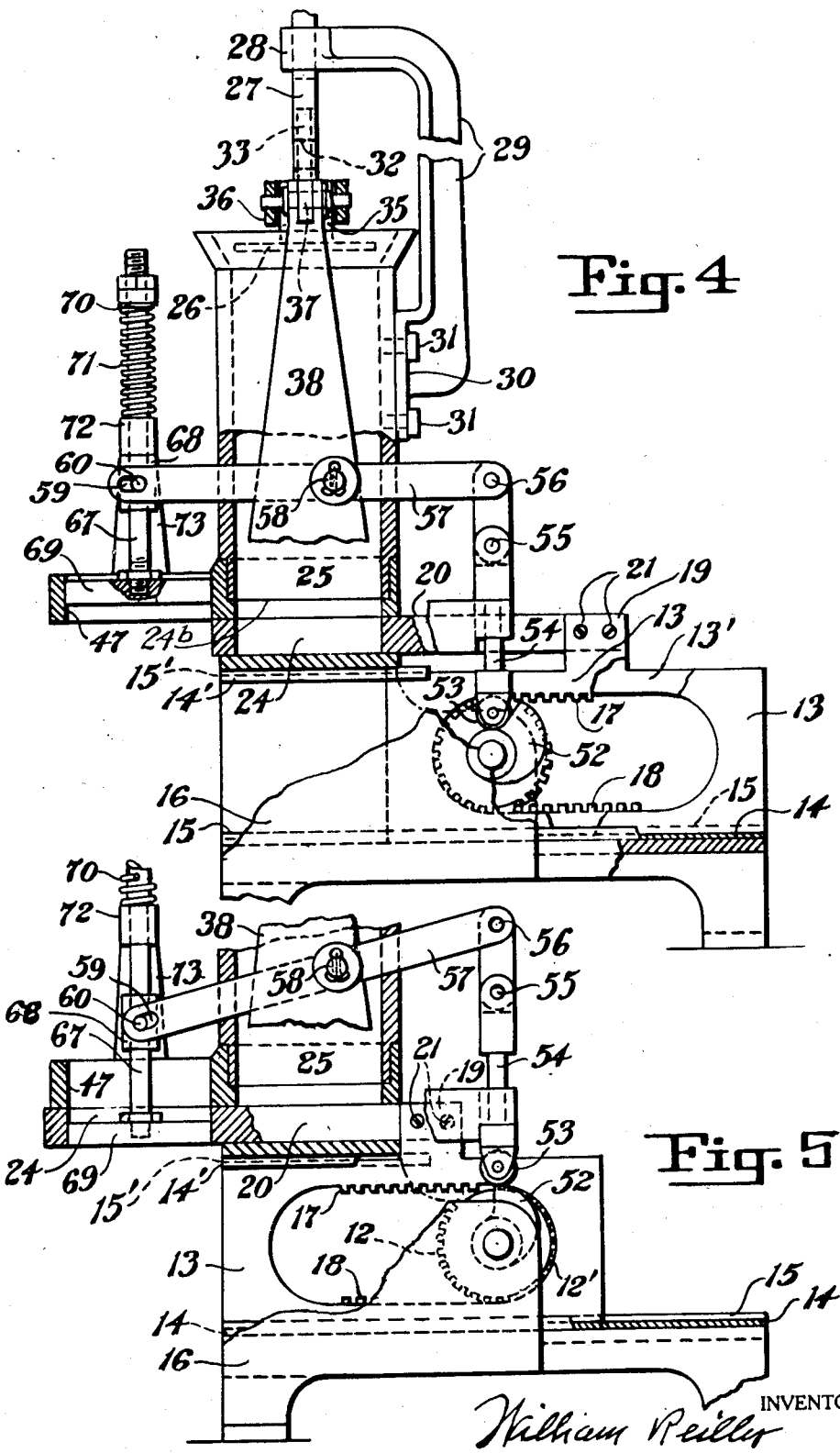

In the drawings, wherein similar reference characters designate similar parts thruout the respective views, Figure 1 is a side elevation of my machine, partly in section, Figure 2 is a top plan view of my invention, partly broken away, Figure 3 is view taken at right angles to Figure 1 showing certain parts fragmentarily, Figure 4 is a front elevation of my machine, partly in section, Figure 5 is a fragmental detail view of parts shown in Figure 4, Figure 6 is a perspective view of the hamburger cake former, Figure 7 shows side elevations of the two racks imparting movements to the cake former, and Figure 8 is a detail view, partly in section, of a yoke associated with the meat tamping mechanism.

Referring to the drawings, which are merely illustrative of my invention, 10 designates a single shaft carrying a fly-wheel 11, and also a pair of separated gear wheels 12 and 12' which mesh with the teeth of slidable racks 13 and 13', the respective racks being slidably guided upon tracks 14, 14' formed respectively upon the lower and upper parts of a frame or bearing member 16, the tracks providing grooves 15, 15' into which the adjacent edges of the racks slidably project. Thus the racks are vertically disposed in parallel relation for movement in opposite directions. As is shown in Figure 7, the racks are preferably formed rectangular in shape, one of the racks 13 having teeth 17 formed upon its upper edge only, while the other rack 13' is formed with teeth upon its lower edge 18, only, so that the gear 12 meshes with the teeth 17 of rack, 13, while gear 12' meshes with teeth 18 of the rack 13'.

A slidable meat caker or former 20 is provided, being operatively secured by fasteners 21 between and to lugs 19 and 23 formed so as to extend upwardly respectively upon racks 13 and 13', so that the former 20 will move in unison with these racks. It will here be understood that the gears 12, 12' are preferably mutilated gears so designed that the teeth are formed at diametrically opposite points upon the respective gears 12, 12', so that as the shaft turns one gear engaging the teeth of one rack will slide the rack and former in one direction, while the other gear has no teeth in mesh with the corresponding teeth of the other rack, so that the first gear alone is active; but as soon as the first gear shall have slid the first rack the full stroke allotted to it, then the teeth of the second gear instantly mesh with the teeth of its own rack, so as the shaft continues to rotate, the second rack is slid in an opposite direction to the path of movement of the first rack, while the first gear remains inactive.

The former is shaped to have an opening 24 formed in a preferably polygonal frame 22, the outer edge of this frame having a shearing edge as at 21ª. A chute of any desirable shape is designated 25 and extends vertically from the frame 16, its bore designed to register normally with the opening 24 of the former 20, this being shown clearly in Figure 4. Projecting into the chute 25 is a tamping member or plunger head 26 secured upon a plunger rod 27 guided for vertical reciprocating movement within a rigid collar 28 formed upon or carried by the horizontal extension arm formed in turn upon a vertical post 29 having a base portion 30 secured fixedly in position upon a side of the chute by means of desirable fasteners 31. Formed upon one longitudinal edge of the plunger rod 27 are ratchet teeth 32, shown in Figure 1, with which is designed to cooperate for actuating purposes a dog 33 fulcrumed upon a pivot 34 tapped into a collar 35 snugly embracing the adjacent portion of plunger rod 27, said collar being fixedly secured against displacement from this rod by pins 35ª on said collar engaging operatively a yoke 36 formed in an integral operating arm, which is a lever having a handle 41 at one end, by means of which it can be manually swung upon pivot pin 37, upon which pin this lever is fulcrumed and operatively supported. Pivot pin 37 is carried by a rigid post 38 fixedly secured by fasteners 39 to the frame 16.

Connected at its upper end to the lever carrying the handle 41 is a rod 42 guided for slidable movement in a bearing or sleeve 42ª formed upon a post 43ª operatively secured to the frame 16. The lowermost end of rod 42 terminates in a part 43 which is fulcrumed upon a pin 44 secured upon an arm 48 pivoted at 46 upon frame 16, a rocker arm 47 being operatively constrained to move in unison with this arm 48, which rocker arm is operatively attached at its free end to the outer end of a compression spring 48' secured at its opposite end directly upon the frame 16.

Designed to actuate to tilt and depress arm 48 is a roller 49 trunnioned upon a pin 50 secured upon a cam 51 fixed upon the shaft 10, as shown in Figure 3; also fixedly mounted upon shaft 10, as shown clearly in Figure 5 is a tappet 52 designed to wipe against a roller 53, intermittently, this roller being mounted at the extreme lower end of a vertically movable rod 54 secured thru coupling 55 to a part carrying a pin 56 upon which is fulcrumed a lever 57, which in turn is fulcrumed intermediate its ends upon a fixed pivot pin 58, secured upon the fixed post 38, hereinbefore described. It will be observed that the lever 57 (see Figure 2) is bent around so as to be offset to clear one corner of chute 25, so that the free end of this lever 57 is operatively secured thru a pin 60, passing thru an elongated slot 59 in lever 57, to a collar 68 fixedly mounted for movement with a rod 67 the lower end of which is secured rigidly upon an expressing plunger head 69, slidably mounted in a hollow guide member 47 extending as a preferably integral projection from chute 25, the member 47 being so juxtaposed that the former frame 22 may slidably wipe against its under edge to allow the opening 24 of former 20 to register with the opening in member 47. Collar 68 on rod 67 is designed to engage lug 72 rigidly formed upon a downwardly-extending brace arm 73 secured to the frame 16 at its lowermost end. The rod 67 slidably projects above lug 72 (see Figure 4) and carries at its uppermost end a head or the heads 70 designed, when the rod 67 moves downwardly, to press down upon a retractible spring 71 coiled around rod 67, one end of this spring bearing upon lug 72 while its upper end engages nut 70.

In operation when it is desired to provide hamburger steak cakes or slices, or for that matter slices of any other food, such as butter, cheese, or the like, the crank handle of fly-wheel 11 will be taken hold and the shaft 10 rotated in one direction; or a motor (not shown) may have operative connections designed to automatically drive the shaft 10. As shaft 10 turns around it is contemplated that one slice of the meat in the chute 25 be severed and expressed so as to fall from the machine.

First it is desirable that the hamburger steak meat or other contents of the chute be packed or inserted into the chute, clear up to the outer end of the chute, but allowing just enough space at the extreme upper end of this chute 25 to permit plunger head 40 to rest upon the meat. When the operator effects the turning of shaft 10, the teeth of neither gear 12 nor 12' engages the corresponding teeth upon the racks 13, 13', at least for a few seconds; during this lull in the gears, the cam 51 is moving in a manner to cause its roller 49 to depress lever 48, against the tension of spring 48', which spring is expanded by rocker arm 47 attached to lever 48 as hereinbefore described. The depression of lever 48 causes rod 42 to be temporarily pulled down, causing lever or yoke 36 to be pulled down also, whereby thru pins 35ª the plunger rod is operated as follows: as the yoke 36 moves down, pins 35ª urge the collar 35 down, so the dog 33 on this collar forces down plunger rod 27 as this dog bears upon one tooth of this rod, designated 32. As plunger rod 27 moves downwardly the plunger head 40 tamps the meat in the chute 25, forcing the meat down thru the chute into the opening 24 of the former 20, it being understood that this former slides transversely thru a thru opening formed in the chute 25, the bottom of the chute designated 24ᵇ, supporting the cake of meat pressed into the opening 24 of the former from chute 25. Cam 51 then leaves lever 48, and spring 48' relaxes, restoring levers 48 and 42 to their normal positions, and as plunger-operating dog 33 comes up again, it secures a foothold upon a tooth higher than the previous tooth, while plunger rod 27 and head 40 remain unaffected by the movement of the dog, having projected farther into the chute.

Next, gear 12 on shaft 10 meshes with the teeth 17 of the rack 13, whereupon this rack 17 travels to the left a full stroke, while gear 12' is idle and inactive; this carries the former 20 with its contained meat also to the left to a point shown in Figure 5, where the meat in former 20 is in registration with the opening in the guide member 47. Immediately this take place, cam or tappet 52 acts to lift rod 54 which effects the lifting of the inner end of lever 57 and the lowering of the outer end of lever 57, so that plunger 67 is forced down, against the tension of spring 71, and causes the piston or head 69 to force out or express the meat from the opening 24 in the frame 22 of the meat former or caker 20. The meat may then fall upon a sheet of paper on a table or other support. As the shaft continues to move, cam or tappet 52 leaves plunger 54, whereupon spring 71 relaxes and the parts are restored to normal position.

Next, as the shaft continues to rotate to complete one revolution, gear 12' on this shaft, engages with its teeth with the teeth 18 of the other rack, 13', while gear 12 is idle and inactive, and this time the rack 13' is caused to slide in a direction counter to the movement described in connection with rack 13; this rack 13' travels to the right and carries the former back to its normal position, so the opening 24 of the former again comes into registration with the bore of chute 25. During the next turning over of shaft 10 the operation is repeated, the tamping head 40 presses the meat in chute 25 into opening 24 of the former, the former is carried forward, its meat is expressed out, and the former comes back to normal position. Finally after all the meat in the chute has been forced out, the operator takes plunger rod 27, out of the chute, after disengaging the dog 33 from its teeth; he fills the chute with more meat, then replaces the dog and plunger rod. I claim all variations falling within the purview of the appended claim.

What I desire to claim and seek by Letters Patent is:—

In a machine of the class described, a shaft, a fly wheel thereon, a pair of mutilated gears having their teeth formed at diametrically opposite points in spaced relation on said shaft, slidable racks in mesh with the teeth of said gears, tracks for slidably guiding said racks, one of said racks having teeth formed on its upper edge only, and the other having teeth formed at its lower edge only, said racks vertically disposed in parallel relation for movement in opposite directions, a former secured to said racks and adapted to move in unison therewith, one of said gears engaging the teeth of one rack to slide the rack and former in one direction, and the other of said gears having its teeth at this time out of mesh with the teeth of said rack, for imparting a reciprocatory motion to said former, means for tamping meat into said former, means for slicing the tamped meat, means for expressing the slices from the former onto a support, and a means for returning the parts into their normal position.

In witness whereof he has hereunto set his hand this 28th day of February, 1926.

WILLIAM REILLY.